United States Patent
Murrin et al.

(10) Patent No.: US 10,387,155 B2
(45) Date of Patent: Aug. 20, 2019

(54) CONTROLLING REGISTER BANK ACCESS BETWEEN PROGRAM AND DEDICATED PROCESSORS IN A PROCESSING SYSTEM

(71) Applicant: Imagination Technologies Limited, Kings Langley (GB)

(72) Inventors: Paul Murrin, Chepstow (GB); Gareth Davies, Rickmansworth (GB); Adrian J. Anderson, Chepstow (GB)

(73) Assignee: Imagination Technologies Limited, Kings Langley (GB)

( * ) Notice: Subject to any disclaimer, the term of this patent is extended or adjusted under 35 U.S.C. 154(b) by 471 days.

(21) Appl. No.: 15/079,269

(22) Filed: Mar. 24, 2016

(65) Prior Publication Data

US 2016/0283235 A1    Sep. 29, 2016

(30) Foreign Application Priority Data

Mar. 24, 2015  (GB) .................................. 1504979.4

(51) Int. Cl.
*G06F 9/30*    (2018.01)
*G06F 15/76*   (2006.01)
*G06F 15/167*  (2006.01)

(52) U.S. Cl.
CPC ........ *G06F 9/30098* (2013.01); *G06F 15/167* (2013.01); *G06F 15/76* (2013.01)

(58) Field of Classification Search
CPC .................................................. G06F 9/30098
See application file for complete search history.

(56) References Cited

U.S. PATENT DOCUMENTS

| | | | | |
|---|---|---|---|---|
| 4,862,407 A * | 8/1989 | Fette | ....................... | G06F 9/226 712/35 |
| 8,135,853 B1 * | 3/2012 | Khan | .................... | G06F 9/3004 709/228 |
| 2006/0075211 A1 * | 4/2006 | Vorbach | ................ | G06F 9/3877 712/221 |
| 2008/0005547 A1 * | 1/2008 | Papakipos | ............. | G06F 9/5027 712/244 |
| 2009/0235047 A1 * | 9/2009 | Hachmann | ............ | G06F 9/3877 712/29 |

(Continued)

FOREIGN PATENT DOCUMENTS

| CN | 203276274 U | 11/2013 |
|---|---|---|
| GB | 2217056 A | 10/1989 |

(Continued)

*Primary Examiner* — Andrew Caldwell
*Assistant Examiner* — Michael J Metzger
(74) *Attorney, Agent, or Firm* — Vorys, Sater, Seymour and Pease LLP; Vincent M DeLuca

(57) ABSTRACT

A processing system includes a program processor for executing a program, and a dedicated processor for executing operations of a particular type (e.g. vector processing operations). The program processor uses an interfacing module and a group of two or more register banks to offload operations of the particular type to the dedicated processor for execution thereon. While the dedicated processor is accessing one register bank for executing a current operation, the interfacing module can concurrently load data for a subsequent operation into a different one of the register banks. The use of multiple register banks allows the dedicated processor to spend a greater proportion of its time executing operations.

18 Claims, 6 Drawing Sheets

(56) References Cited

U.S. PATENT DOCUMENTS

| | | | |
|---|---|---|---|
| 2010/0045682 A1* | 2/2010 | Ford | G06F 9/30076 345/502 |
| 2012/0066480 A1* | 3/2012 | Hanaki | G06F 9/30145 712/206 |
| 2012/0204008 A1* | 8/2012 | Dockser | G06F 9/3802 712/208 |
| 2014/0006757 A1* | 1/2014 | Assarpour | G06F 9/38 712/226 |
| 2015/0054837 A1* | 2/2015 | Havlir | G06F 9/30072 345/506 |
| 2015/0106596 A1* | 4/2015 | Vorbach | G06F 9/3001 712/221 |

FOREIGN PATENT DOCUMENTS

| | | |
|---|---|---|
| JP | H0644193 A | 2/1994 |
| WO | 2014/022050 A1 | 2/2014 |

\* cited by examiner

CONTROLLING REGISTER BANK ACCESS BETWEEN PROGRAM AND DEDICATED PROCESSORS IN A PROCESSING SYSTEM

BACKGROUND

Processing systems generally include one or more processors (or "processing units"), such as a Central Processing Unit (CPU), a Digital Signal Processor (DSP) and/or a Graphics Processing Unit (GPU) to give just some examples. Processors are typically configured to execute operations directed by instructions of a computer program, such as moving data and/or manipulating data within the processing system. For example, an operation of a program may involve performing arithmetic on data items, such as a multiplication or addition. Some processors may be more suited to particular tasks than other processors. For example, a CPU may be designed as a general purpose processor which can process a variety of operations fairly efficiently, whereas a DSP may be specifically designed with its architecture optimized for the operational needs of digital signal processing, whilst a GPU may be specifically designed for processing graphics data.

There are many different computer coding languages in which a computer programmer may write a computer program, but some of the languages are more popular than others, for example C code is widely known by computer programmers. It can be useful for a processing system to include a processor (e.g. a CPU) which is designed to process the code of a program written in a common computer language, such as C, so that it is simple for programmers to write code which can be processed by the processing system. However, in some situations, it may be beneficial for a processing system to execute particular types of operations on dedicated processors which are specifically adapted for executing operations of those particular types. For example, it may be more efficient (e.g. in terms of time, power and/or use of processing resources) to execute operations for digital signal processing on a DSP rather than on a CPU. Therefore, two or more processors may be included in a processing system, whereby operations may be executed by a processor which is best suited for executing the operation. For example, a processing system may include a main processor (or "program processor"), e.g. a general-purpose CPU, on which a program may be executed, and a dedicated processor, e.g. a DSP or a GPU, which is adapted for executing operations of a particular type. When the program processor comes to an operation of the particular type within a program (e.g. a vector processing operation) the program processor can pass (i.e. offload) the operation to the dedicated processor for execution thereon. The dedicated processor may have a register bank including a plurality of registers into which data can be loaded for an operation to be processed by the dedicated processor. The dedicated processor can then execute the operation using the data stored in the registers of its register bank. The results of the operation may be stored in the registers of the register bank when the dedicated processor has completed execution of the operation. The program processor can then read the data out of the registers and carry on with execution of the program. Alternatively, a memory (instead of the register bank of the dedicated processor) may be used for communicating data between the dedicated processor and the program processor. For example, the dedicated processor may retrieve data from the memory and may perform an operation on the retrieved data. The dedicated processor may store the results of an operation in the memory when the dedicated processor has completed execution of the operation, and the program processor may then read the data out of the memory.

In this way, the program can be executed more efficiently because the dedicated processor is adapted to be more efficient than the program processor at executing operations of the particular type (e.g. a DSP is usually more efficient than a CPU at executing vector processing operations). Therefore, by using the dedicated processor, the job of executing some of the operations of a program can be offloaded from the main processor (the "program processor"). In this way, the workload of the program processor can be reduced. Any improvements to the efficiency (e.g. in terms of speed, power and/or use of processing resources) with which a processing system can execute operations of a program are likely to be beneficial.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In the processing systems described in the background section above, the aim is to offload work from the program processor onto a dedicated processor, with the focus being on reducing the workload of the program processor. In contrast, the inventors have realised that some processing systems are used primarily for executing operations of a particular type, wherein a dedicated processor is adapted for executing operations of the particular type. It can be beneficial to use the dedicated processor to execute the operations of the particular type (because it is adapted so as to be more efficient than the program processor at executing operations of the particular type). Furthermore, in accordance with examples described herein the workload on the dedicated processor may be decreased using an interfacing module to control data flow between the program processor and the dedicated processor using a group of two or more register banks. The use of multiple register banks allows the dedicated processor to spend a greater proportion of its time executing operations, so a sequence of operations can be executed faster (as compared to the processing systems described in the background section above).

In particular, there is provided a processing system comprising: a dedicated processor adapted for executing operations of a particular type; a program processor configured to execute a program including a plurality of operations, wherein the program processor is configured to cause an operation of the program which is of the particular type to be executed by the dedicated processor; a group of two or more register banks configured to store data relating to operations of the particular type; an interfacing module configured to control data flow between the program processor and the dedicated processor using the group of register banks by: concurrently: (i) providing the dedicated processor with access to one of the register banks which stores previously loaded data for a current operation, thereby allowing the dedicated processor to execute the current operation, and (ii) accessing a different one of the register banks to load data for a subsequent operation into said different one of the register banks for setting up the subsequent operation for subsequent execution by the dedicated processor; and subsequent to the dedicated processor completing execution of the current operation, controlling the group of register banks to provide the dedicated processor with access to the data for the subsequent operation from one of the register banks of the group of register banks, thereby allowing the dedicated processor to execute the subsequent operation.

There is provided a method of processing operations of a program comprising: executing the program at a program processor, wherein the program processor causes an operation of the program which is of a particular type to be executed by a dedicated processor, wherein the dedicated processor is adapted for executing operations of the particular type; controlling data flow between the program processor and the dedicated processor using a group of register banks by: concurrently: (i) providing the dedicated processor with access to one of the register banks which stores previously loaded data for a current operation, thereby allowing the dedicated processor to execute the current operation, and (ii) accessing a different one of the register banks to load data for a subsequent operation into said different one of the register banks for setting up the subsequent operation for subsequent execution by the dedicated processor; and subsequent to the dedicated processor completing execution of the current operation, controlling the group of register banks to provide the dedicated processor with access to the data for the subsequent operation from one of the register banks of the group of register banks, thereby allowing the dedicated processor to execute the subsequent operation.

Any of the processing systems described herein may be embodied in hardware on an integrated circuit. There may also be provided computer readable code for generating a processing system according to any of the examples described herein. The computer readable code may be encoded on a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
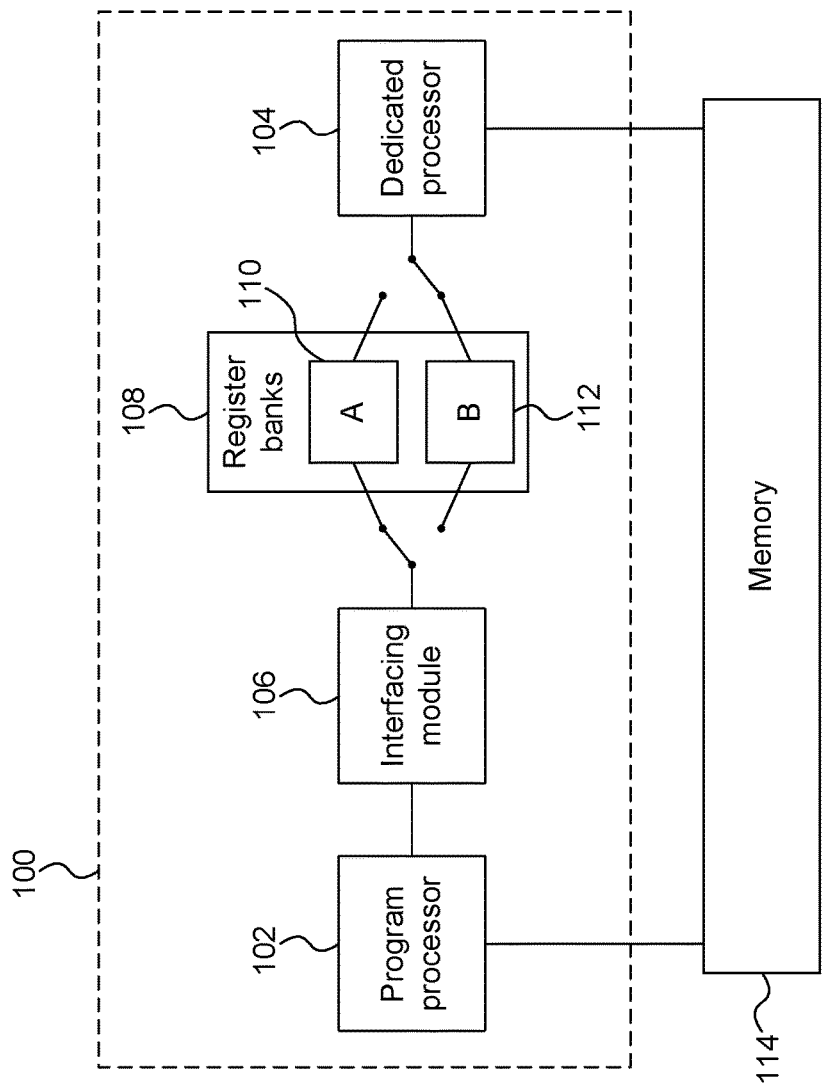
FIG. 1 is a schematic diagram of a processing system in a first example.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only.

In examples described herein a processing system comprises a program processor, e.g. a CPU, which is configured to execute a program including a plurality of operations. The program processor may be adapted for processing operations written in a commonly understood programming language, such as C. The processing system also comprises a dedicated processor, such as a DSP, which is adapted for executing operations of a particular type (e.g. data-parallel operations such as vector operations). The dedicated processor might be configured to execute operations written in a bespoke language, which might not be commonly understood. Since the dedicated processor may be more efficient than the program processor for executing operations of the particular type, the code for these operations is written for execution by the dedicated processor, e.g. in the bespoke language for the dedicated processor. However, the nature of the dedicated processor and the operations required to be executed on it may make it difficult to write a compiler for compiling high level instructions (e.g. written in C) that would generate code in the bespoke language. Therefore, rather than writing the whole program (including dedicated operations and the program flow for organising the execution of a sequence of operations) in the bespoke language, the program flow is offloaded from the dedicated processor to the program processor. There is often a lot of complexity in the program flow and by implementing this on the program processor it can be written in a high level language (e.g. C) which is simpler to write, modify, maintain, and/or otherwise use compared to the bespoke language of the dedicated processor. So even for a program including predominantly operations of a type which are to be executed by the dedicated processor it can be beneficial to write the program flow of the program for execution on the program processor, since such code may be more easily understood and more easily written and modified than code written in the bespoke language for execution on the dedicated processor.

In examples described herein, an interfacing module is used to control data flow between the program processor and the dedicated processor in a manner that enables the dedicated processor to efficiently execute operations. In particular, a group of two or more register banks are used to store data (e.g. control data) relating to operations which are executed by the dedicated processor. The interfacing module manages the data flow through the register banks to allow the dedicated processor to execute a current operation using data from one register bank whilst data for the next operation is being loaded into a different register bank. When the dedicated processor completes execution of the current operation, the interfacing module can control the group of register banks such that the dedicated processor is provided with access to the data for the subsequent operation from one of the register banks, such that the dedicated processor can execute the subsequent operation. This cycle can be iterated for a sequence of operations which are to be performed by the dedicated processor, such that the next operation can be queued for execution on the dedicated processor whilst the current operation is executed by dedicated processor. In this way, the dedicated processor can spend a greater proportion of time executing operations, which is what it is designed for, compared to a system in which one operation is fully executed by the dedicated processor before the data for the next operation is loaded into the registers so that the dedicated processor can execute the next operation. In examples described herein, it can be useful to attempt to maximise the proportion of time that the dedicated processor spends executing operations, or at least attempting to increase the proportion of time that the dedicated processor spends executing operations compared to the systems described in the background section.

FIG. 1 shows a processing system 100 in a first example. The processing system 100 comprises a program processor 102 configured to execute a program, a dedicated processor 104 adapted for executing operations of a particular type, an interfacing module 106 and a set of register banks 108. In the example shown in FIG. 1, the set of register banks 108 comprises a first register bank 110 (labelled "A" in FIG. 1) and a second register bank 112 (labelled "B" in FIG. 1). Each of the register banks (110 and 112) includes registers that the dedicated processor 104 can use in order to execute operations. That is, the register banks 110 and 112 are configured to store data (e.g. control data) relating to operations of the particular type which the dedicated processor 104 is adapted to execute. The processing system 100 is connected to a memory 114, which may for example be Random Access Memory (RAM). In particular, the program processor 102 and the dedicated processor 104 are each connected to the memory 114 and can read and/or write data from and/or to the memory 114. As described above, the program processor 102 is a general purpose processor (e.g. a CPU) which can execute a program written in a commonly understood programming language, such as C; whereas the dedicated processor 104 is a specialized processor in the sense that it is adapted for performing a particular type of operation very efficiently. For example the dedicated processor 104 may be a DSP adapted for processing data-parallel operations, such as vector operations, or the dedicated processor 104 may be a GPU adapted for processing graphics data.

The interfacing module 106 is coupled to the program processor 102. For example, the interfacing module 106 may be coupled to a coprocessor port of the program processor 102. As another example, the interfacing module 106 could be coupled to the program processor 102 via a register interface. However, coupling the interfacing module 106 to the coprocessor port of the program processor 102 ensures that the interaction between the interfacing module 106 and the program processor 102 is efficient. The interfacing module 106 can make use of assembler instructions which are native to the program processor 102 to provide an interface with the dedicated processor 104. The dedicated processor 104 is programmed in its bespoke language (e.g. its native assembly language), but only for executing the desired operation(s) and not the whole program, in particular not the program flow. So in effect desired operations are written as functions in the native language of the dedicated processor 104 for execution thereon, and a program (e.g. written in a high level language such as C) runs on the program processor 102 to implement the control flow. Furthermore, when instructions are assembled for the dedicated processor 104, an interface is generated which allows the instructions to be controlled via a high level language, such as C. That is, the operations that are written for execution by the dedicated processor 104 may effectively be C-callable functions which cause the desired operations to be executed on the dedicated processor. This ensures that interfacing and integration are easy to implement and maintain the clarity of the programmer's intent when writing the program.

In comparison to the processing systems described in the background section above, the processing system 100 includes an extra or "shadow" set of registers for use by the dedicated processor 104. That is, there are two register banks 110 and 112. Each register bank 110 and 112 can store data for operations to be executed by the dedicated processor 104. Since there are two register banks, the dedicated processor 104 can access one of the register banks for executing an operation whilst data for another operation is being moved into or out of the other register bank. In the example shown in FIG. 1, each of the register banks is configured to be coupled to either the dedicated processor 104 or the interfacing module 106 at any given time. The interfacing module 106 controls the coupling of the register banks 110 and 112 (to either the dedicated processor 104 or the interfacing module 106) such that when the dedicated processor 104 is coupled to a first of the register banks (e.g. 110) the interfacing module 106 is coupled to a second of the register banks (e.g. 112), and vice versa.

The "data relating to an operation" which is stored in the register banks (and which is referred to throughout this application) may, or may not, include all of the data relating to the operation. For example, the data relating to an operation which is stored in the register banks may include control data (e.g. only control data) for the operation, and the dedicated processor 104 may operate on data resident in the memory 114 in accordance with the control data. That is, the dedicated processor 104 may retrieve data from the memory 114, operate on it in accordance with the control data received via the interfacing module 106, and write results data back out to the memory 114. Therefore, it may be the case that not all of the data relating to an operation goes through the interfacing module 106.

Figure 2:
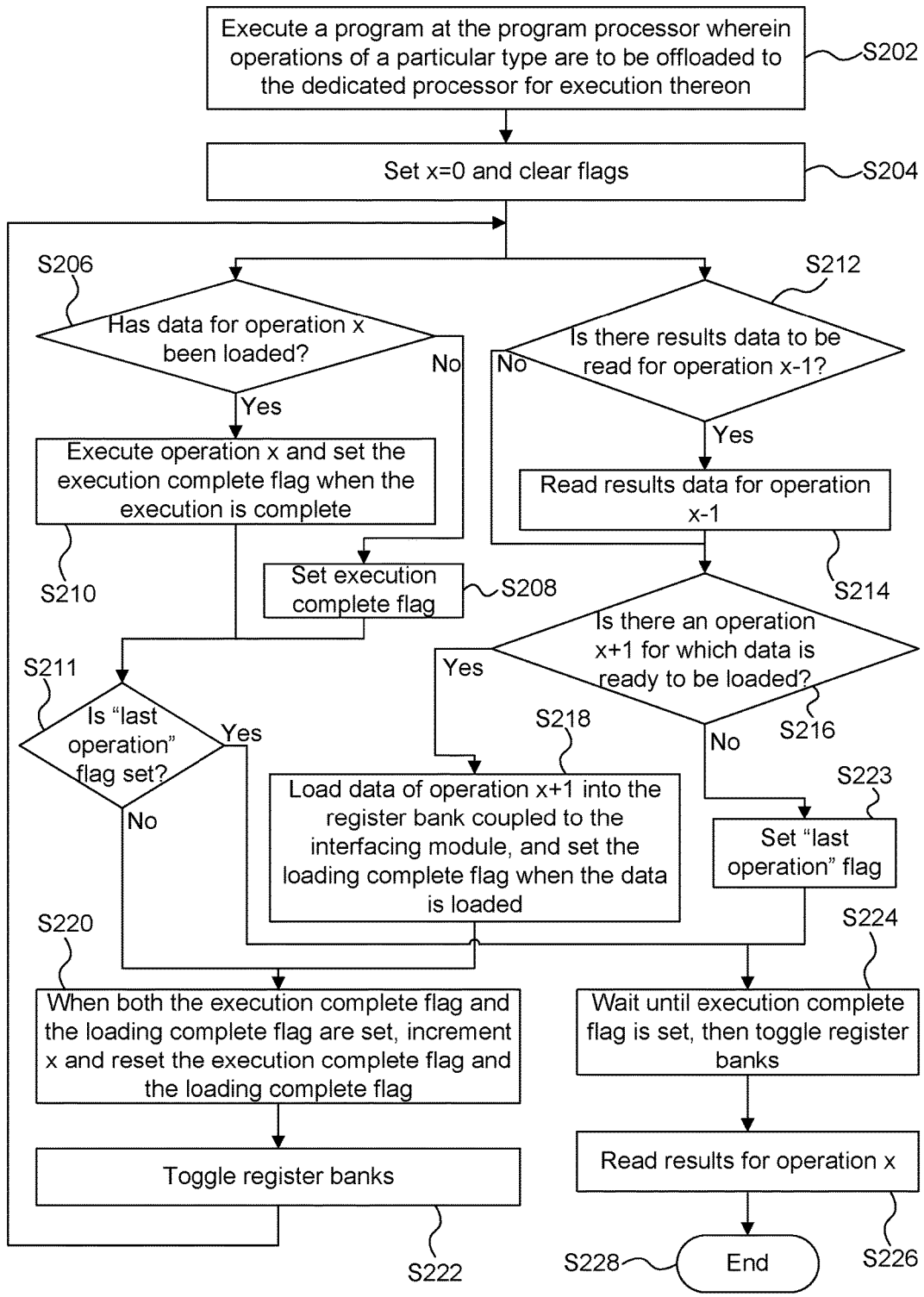
FIG. 2 shows a flow chart illustrating a method of processing operations of a program in a processing system.
Figure 3:
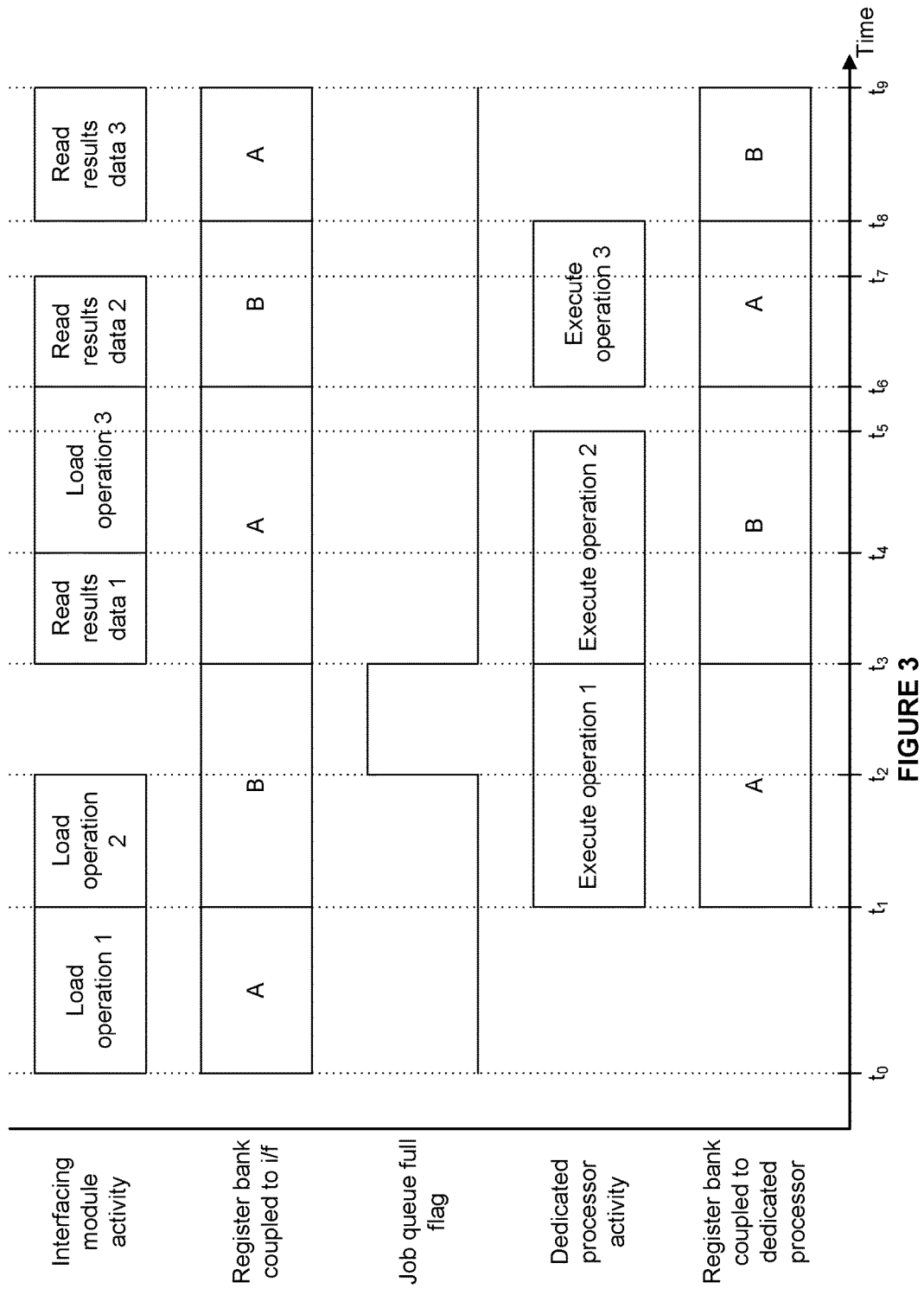
FIG. 3 shows a timing diagram for parts of the processing system.

With reference to the flow chart shown in FIG. 2 and the timing diagram shown in FIG. 3, a method of processing operations of a program using the processing system 100 is now described.

In step S202 the program begins to be executed by the program processor 102. As described above, the program processor 102 is arranged to execute code written in a high level language, such as C. Operations of the program which are of a particular type (e.g. digital signal processing operations) are to be offloaded to the dedicated processor 104 for execution thereon (e.g. where the dedicated processor 104 is a DSP) and are written in the bespoke language for the dedicated processor 104. For example, the program may include a sequence of operations of the particular type such that there is a sequence of operations to be performed by the dedicated processor 104. These operations are initiated by the interfacing module 106 such that they can be executed on the dedicated processor 104.

The interfacing module 106 facilitates the execution of operations by the dedicated processor 104. In particular, where there is a sequence of operations to be executed by the dedicated processor 104, the interfacing module 106 provides data to the dedicated processor 104 (via the register banks 108) such that the dedicated processor 104 can execute the operations in turn. As described above, the interfacing module 106 may be connected to the coprocessor port of the program processor 102, and may communicate with the program processor 102 in accordance with a protocol by which communication can occur on the coprocessor port of the program processor 102. This means that the way in which the program processor 102 interacts with the interfacing module 106 can be easily understood by a programmer who writes the code for the program, irrespective of the protocol with which the dedicated processor 104 is configured to operate. Furthermore, the code that handles the interfacing module 106 is auto-generated, at compile time, such that the complexity therein is hidden from the programmer and a C function that is called from the program processor 102 causes execution of the desired operation by the dedicated processor 104. That is, the interfacing module 106 uses the auto-generated code to load a description of an operation to be executed by the dedicated processor 104, and then causes the dedicated processor 104 to execute the operation. Therefore, the detail of the interfacing between the program processor 102 and the interfacing module 106 is hidden from the programmer and simplified by auto-generating the code which manages this.

The programming model presented to the programmer is that of a job queue. Processing jobs can be queued to run on the dedicated processor 104, and the program processor 102 can then either wait for these jobs to complete or can continue doing other processing (which might, for example, include setting up the next job to run on the dedicated processor 104) while the jobs are processed by the dedicated processor 104. Once a job has completed on the dedicated processor 104, the program processor 102 can read results of that job, again using auto-generated code to simplify the interface. The interfacing module 106 takes parameters to the C callable function and generates other parameters using auto-generated code, wherein the generated parameters describe the job to be executed on the dedicated processor 104. The interfacing module 106 communicates the generated parameters to the dedicated processor 104 by writing them into registers within one of the register banks 108. The interfacing module 106 also deals with job start and completion, presenting the correct registers to the dedicated processor 104 and to the program processor 102 at the relevant times.

In the example shown in FIG. 1, initially, the interfacing module 106 is coupled to the first register bank 110 and the dedicated processor 104 is coupled to the second register bank 112, but in other examples this could be the other way around. Although it is not explicitly illustrated in FIG. 1, the interfacing module 106 can control the coupling of the register banks 110 and 112 to the interfacing module 106 and the dedicated processor 104, e.g. by toggling the switches shown in FIG. 1. The switches can be controlled to be in a contrary configuration to one another at all times. Therefore, when the dedicated processor 104 uses data from register bank A 110, the register bank B 112 is visible to the program processor 102 via the interfacing module 106, and vice versa.

A variable "x" is used to identify the different operations of a sequence of operations. In step S204 the interfacing module sets x to be zero in order to begin the execution of a sequence of operations on the dedicated processor 104. As described below, a number of flags are used in the method (e.g. an execution complete flag, a loading complete flag and a last operation flag). In step S204, these flags are cleared (i.e. unset) to ensure that the method commences with the flags in the correct state. FIG. 3 shows a timing diagram illustrating the activity and states of parts of the processing system 100 as a sequence of three operations are passed to the dedicated processor 104 and executed thereon.

The method then passes to both of steps S206 and S212, which are performed in parallel, e.g. concurrently. In step S206 the interfacing module 106 determines whether data for operation x has been loaded into the register bank coupled to the dedicated processor 104. In the first iteration, there is no data yet loaded into either of the register banks 110 or 112 for operations to be executed by the dedicated processor 104, so the method passes to step S208 in which an 'execution complete' flag is set. This flag indicates that the dedicated processor 104 is not currently executing an operation. The method passes from step S208 to step S211 in which the interfacing module 106 determines whether the "last operation" flag is set. Initially the "last operation" flag is not set and it is only set when the last operation of a sequence is being executed, as described in more detail below. When the "last operation" flag is not set the method passes from step S211 to step S220 which is described in more detail below.

If data has been loaded for operation x then the method passes from step S206 to step S210, which is described in more detail below.

In step S212 the interfacing module 106 determines whether there is results data to be read for operation x−1 from the register bank which is coupled to the interfacing module 106. In the first iteration, there is no results data yet loaded into either of the registers 110 or 112 since no operations of the sequence have been executed yet by the dedicated processor 104. The method therefore passes to step S216.

In step S216 the interfacing module 106 determines whether there is an operation x+1 for which data is ready to be loaded into one of the registers 110 or 112. In the first iteration, there is an operation 1 for which data can be loaded into one of the register banks 110 or 112. Therefore, the method passes to step S218 in which the interfacing module 106 loads data of operation x+1 into the register bank (110 or 112) which is currently coupled to the interfacing module 106. In the example shown in FIG. 3, the interfacing module 106 is coupled to register bank A 110 at a time $t_0$ and the interfacing module 106 loads data for operation 1 into register bank A 110. Loading the data for operation 1 into the register bank A 110 sets up operation 1 for subsequent execution by the dedicated processor 104. The interfacing module 106 completes the loading of the data for operation 1 into the registers of register bank A 110 at time $t_1$. A 'loading complete' flag is set to indicate that the loading of the data is complete. The loading complete flag may also be referred to as a 'job queue full' flag since it indicates that there is a job waiting for execution by the dedicated processor 104.

In step S220, when both the execution complete flag and the loading complete flag are set (as they will be at time $t_1$ following steps S208 and S218 respectively), the variable x is incremented (e.g. from 0 to 1 in the first iteration) and the two flags (the execution complete flag and loading complete flag) are reset, i.e. 'unset'. Each of the flags may, for example, be represented by one bit. Then in step S222 the interfacing module 106 toggles the register banks 110 and 112, such that the coupling of the register banks 110 and 112 to the interfacing module 106 and the dedicated processor 104 is switched. This toggling can be thought of as flipping the two switches shown in FIG. 1 which couple the register banks 110 and 112 to either the interfacing module 106 or the dedicated processor 104. However, it is noted that the switches are shown in FIG. 1 for conceptual understanding, and the toggling of step S222 may be implemented in a number of different ways in different examples as would be apparent to a person skilled in the art, for example using one or more multiplexers instead of switches.

Steps S220 and S222 occur at time $t_1$. Therefore, although the loading complete flag (i.e. the job queue full flag) is set at time $t_1$ in step S218, this flag is then immediately reset at time $t_1$ in step S220, so FIG. 3 does not show this flag being set at time $t_1$. Following step S222, at time $t_1$, the interfacing module 106 is coupled to the register bank B 112, and the dedicated processor 104 is coupled to the register bank A 110. The method then passes back to the parallel steps S206 and S212, wherein on this iteration, x=1.

This time, in step S206 it is determined that data for operation 1 has been loaded into the register bank 110 which is coupled to the dedicated processor 104. Therefore, the method passes from step S206 to step S210 (and not to step S208). In step S210 the dedicated processor 104 executes operation 1 using the data (e.g. control data) stored in the registers of the register bank 110. In cases where the data stored in the registers is just control data of an operation, the dedicated processor 104 may retrieve further data from the memory 114 in order to execute the operation. The operation may for example be a vector processing operation performed on a vector. The dedicated processor 104 is well suited to executing this type of operation. The execution of operation 1 takes from time $t_1$ until time $t_3$. When the dedicated processor 104 has completed the execution of operation 1, the execution complete flag is set, and results data for the operation is stored in the registers of the register bank 110. The results data for an operation may be a result of the operation (e.g. a resulting vector from a vector processing operation) or the results data may be control data, e.g. to indicate that the operation has been performed and to indicate the address in memory 114 of the result of the operation (e.g. a resulting vector from a vector processing operation). The method then passes from step S210 to step S211. Since the last operation flag has not been set, the method passes from step S211 to step S220.

Steps S212 to S218 are performed in parallel with step S206 and S210. That is, whilst the dedicated processor 104 is executing operation x, the interfacing module 106 reads results data of a previously execution operation (if there is any) and loads data for the next operation (if there is one). In step S212, at time $t_1$, the interfacing module 106 determines that there is no results data to be read for operation x−1, so the method passes to step S216. In step S216, at time $t_1$, the interfacing module 106 determines that there is an operation 2 for which data is ready to be loaded. So the method passes to step S218 in which the interfacing module 106 loads data (e.g. control data) of operation 2 into the register bank 112 which is currently coupled to the interfacing module 106. Loading the data for operation 2 into the register bank B 112 sets up operation 2 for subsequent execution by the dedicated processor 104. The interfacing module 106 completes the loading of the data for operation 2 into the registers of register bank B 112 at time $t_2$. The loading complete flag (i.e. the job queue full flag) is set to indicate that the loading of the data is complete at time $t_2$. The method passes from step S218 to step S220.

Step S220 completes at time $t_3$, when both the execution complete flag and the loading complete flag are set. At this time the dedicated processor 104 has finished the execution of operation 1 with the results data for operation 1 being stored in the registers of register bank A 110, and the data for operation 2 has been loaded into the registers of register bank B 112. In step S220 the variable x is incremented (e.g. from 1 to 2 at time $t_3$) and the two flags (the execution complete flag and loading complete flag) are reset, i.e. 'unset'. Then in step S222 the interfacing module 106 toggles the register banks 110 and 112, such that the coupling of the register banks 110 and 112 to the interfacing module 106 and the dedicated processor 104 is switched. Therefore, following time $t_3$ the interfacing module 106 is coupled to register bank A 110, and the dedicated processor 104 is coupled to register bank B 112.

The method then passes back to the parallel steps S206 and S212, where on this iteration, x=2.

This time, in step S206 it is determined that data for operation 2 has been loaded into the register bank B 112 which is now coupled to the dedicated processor 104. Therefore, the method passes from step S206 to step S210. In step S210 the dedicated processor 104 executes operation 2 using the data stored in the registers of the register bank 112. The operation may for example be a vector processing operation performed on a vector. The execution of operation 2 takes from time $t_3$ until time $t_5$. When the dedicated processor 104 has completed the execution of operation 2, the execution complete flag is set, and results data for the operation is stored in the registers of the register bank 112. The method then passes from step S210 to step S211. Since the last operation flag has not been set, the method passes from step S211 to step S220.

Steps S212 to S218 are performed in parallel with step S206 and S210. Therefore, whilst the dedicated processor 104 is executing operation 2, the interfacing module 106 accesses the register bank A 110 to read results data for operation 1 and to load data for the next operation (operation 3). In particular, in step S212, at time $t_3$, the interfacing module 106 determines that there is results data to be read for operation 1, so the method passes to step S214. In step S214 the interfacing module 106 reads the results data for operation 1 from the registers of the register bank A 110 and passes the results data to the program processor 102. The results data for operation 1 finishes being read from the register bank A 110 at time $t_4$.

The method then passes to step S216. In step S216, at time $t_4$, the interfacing module 106 determines that there is an operation 3 for which data is ready to be loaded. So the method passes to step S218 in which the interfacing module 106 loads data of operation 3 into the register bank A 110 which is currently coupled to the interfacing module 106. Loading the data for operation 3 into the register bank A 110 sets up operation 3 for subsequent execution by the dedicated processor 104. The interfacing module 106 completes the loading of the data for operation 3 into the registers of register bank A 110 at time $t_6$ (which is after the time $t_5$ at which the dedicated processor 104 completes the execution of operation 2). The loading complete flag (i.e. the job queue full flag) is set to indicate that the loading of the data is complete at time $t_6$. The method passes from step S218 to step S220.

Step S220 completes at time $t_6$, when both the execution complete flag and the loading complete flag are set. At this time the dedicated processor 104 has finished the execution of operation 2 with the results data for operation 2 being stored in the registers of register bank B 112, and the data for operation 3 has been loaded into the registers of register bank A 110. In step S220 the variable x is incremented (e.g. from 2 to 3) and the two flags (the execution complete flag and loading complete flag) are reset, i.e. 'unset'. Then in step S222 the interfacing module 106 toggles the register banks 110 and 112, such that the coupling of the register banks 110 and 112 to the interfacing module 106 and the dedicated processor 104 is switched. Therefore, following time $t_6$ the interfacing module 106 is coupled to register bank B 112, and the dedicated processor 104 is coupled to register bank A 110.

Steps S220 and S222 occur at time $t_6$. Therefore, although the loading complete flag (i.e. the job queue full flag) is set at time $t_6$ in step S218, this flag is then immediately reset at time $t_6$ in step S220, so FIG. 3 does not show this flag being set at time $t_6$. The method then passes back to the parallel steps S206 and S212, where on this iteration, x=3.

Steps S206 to S211 are performed in parallel with steps S212 to S223. This time, in step S212, at time $t_6$, the interfacing module 106 determines that there is results data to be read for operation 2, so the method passes to step S214. In step S214 the interfacing module 106 reads the results data for operation 2 from the registers of the register bank B 112 and passes the results data to the program processor 102. The results data for operation 2 finishes being read from the register bank B 112 at time $t_7$.

The method then passes to step S216. In step S216, at time $t_7$, the interfacing module 106 determines that there are no more operations for which data is ready to be loaded. So the method passes from step S216 to step S223 in which the "last operation" flag is set. The method then passes to step S224 which is described below.

In step S206 it is determined that data for operation 3 has been loaded into the register bank A 110 which is now coupled to the dedicated processor 104. Therefore, the method passes from step S206 to step S210. In step S210 the dedicated processor 104 executes operation 3 using the data stored in the registers of the register bank 110. The operation may for example be a vector processing operation performed on a vector. The execution of operation 3 takes from time $t_6$ until time $t_8$. When the dedicated processor 104 has completed the execution of operation 3, the execution complete flag is set. The method then passes from step S210 to step S211 in which it is determined that the "last operation" flag has been set. So the method then passes to step S224.

In step S224, the interfacing module 106 waits until the execution complete flag is set, i.e. until time $t_8$ when the dedicated processor 104 has completed the execution of operation 3 and step S211 has been performed. At this time ($t_8$) the interfacing module 106 toggles the register banks, such that the coupling of the register banks 110 and 112 to the interfacing module 106 and the dedicated processor 104 is switched. Therefore, following time $t_8$ the interfacing module 106 is coupled to register bank A 110, and the dedicated processor 104 is coupled to register bank B 112.

Then in step S226 at time $t_8$, the interfacing module 106 reads the results data for operation 3 from the registers of the register bank A 110 and passes the results data to the program processor 102. The results data for operation 3 finishes being read from the register bank A 110 at time $t_9$. Then in step S228 the method ends since all three of the operations of the sequence have been passed to the dedicated processor 104 and executed by the dedicated processor 104, and the results data for all three of the operations of the sequence have been read and passed to the program processor 102. The program processor 102 can continue with the execution of the program, and if further operations are of the particular type for which the dedicated processor 104 is suited, then those operations may be passed to the dedicated processor 104 for execution thereon, in a similar manner to that described above in relation to FIGS. 2 and 3.

In the method described with reference to FIG. 2, the loading complete flag acts as an indication of whether the data (e.g. control data) has finished loading into one of the register banks, and the interfacing module 106 can maintain the loading complete flag to determine whether the data for a subsequent operation has been loaded. Similarly, the execution complete flag acts as an indication of whether a current operation has finished being executed by the dedicated processor 104, and the interfacing module 106 can maintain the execution complete flag to determine whether the dedicated processor 104 has completed the execution of the current operation. The interfacing module 108 can control the group of register banks 108 to provide the dedicated processor with access to the data for the subsequent operation from one of the register banks of the group of register banks 108 responsive to determining that the dedicated processor has completed execution of the current operation and that the data for the subsequent operation has been loaded, e.g. based on the states of the loading complete flag and the execution complete flag. Furthermore, the interfacing module 108 can toggle the coupling of the register banks (110 and 112) to the dedicated processor 104 and the interfacing module 106 responsive to determining that the dedicated processor has completed execution of the current operation and that the data for the subsequent operation has been loaded, e.g. based on the states of the loading complete flag and the execution complete flag.

FIG. 3 illustrates that the use of the interfacing module 106 and the multiple register banks 108 allows the dedicated processor 104 to spend a large proportion of its time executing operations, which is what it is adapted to be efficient at doing. In the example shown in FIG. 3 the execution of the three operations by the dedicated processor 104 is almost continuous between times $t_1$ and $t_8$, although there is a small break in execution between times $t_5$ and $t_6$ because the time taken to read the results data for operation 1 and to load the data for operation 3 is more than the time taken to execute operation 2. It can be appreciated that the processing of the three operations is faster in the system described with reference to FIGS. 1 to 3 than in a system in which each operation is processed (i.e. loaded, executed and then data is read out for the operation) before the next operation is processed, as described in the background section above. For example, the time taken to process the three operations in the example shown in FIG. 3 is $t_9-t_0$. In contrast, if the three operations were processed (loaded, executed and read) sequentially then the time taken to process the three operations would be: $(t_1-t_0)+(t_3-t_1)+(t_4-t_3)+(t_2-t_1)+(t_6-t_3)+(t_7-t_6)+(t_6-t_4)+(t_8-t_6)+(t_9-t_8)$, which equals $(t_9-t_0)+(t_2-t_1)+(t_5-t_3)+(t_7-t_6)$. So, the amount of time that is saved in the example shown in FIG. 3 compared to a sequential processing of the operations is given by $(t_2-t_1)+(t_5-t_3)+(t_7-t_6)$. These are the times for which parallel processing is occurring. That is, between times $t_1$ and $t_2$ the dedicated processor 104 is executing operation 1 using register bank A 110, and concurrently the interfacing module 106 is loading data for operation 2 into register bank B 112; between times $t_3$ and $t_5$ the dedicated processor 104 is executing operation 2 using register bank B 112, and concurrently the interfacing module 106 is reading results data for operation 1 from register bank A 110 and loading data for operation 3 into register bank A 110; and between times $t_6$ and $t_7$ the dedicated processor 104 is executing operation 3 using register bank A 110, and concurrently the interfacing module 106 is reading results data for operation 2 from register bank B 112. Therefore, the concurrent access to different ones of the register banks 108 removes at least some of the time delay for setup of the registers and reading results data from the registers for operations to be executed on the dedicated processor 104.

The example shown in FIG. 3 is for a sequence of three operations, but in other examples a sequence of any number of operations could be handled using the method described with reference to FIG. 2.

In the examples described above the results data for an executed operation is passed from the dedicated processor 104 to the program processor 102 via one of the register banks 108. In alternative examples, results of operations executed by the dedicated processor 104 may be written to the memory 114, whereby if the program processor 102 needs access to the results data it can access the memory 114 in order to obtain the results data. It may be the case that the program processor 102 does not need to receive the results of the operations performed by the dedicated processor 104, in which case the results can be written to the memory 114 without any further need for the program processor 102 to retrieve the results from the memory 114. Furthermore, the interfacing module 106 may provide memory protection to control access of the memory 114 by the dedicated processor 104. For example, the interfacing module 106 may indicate which memory addresses in the memory 114 are valid addresses for the results of operations executed by the dedicated processor 104 to be written to. In this way, if the dedicated processor 104 attempts to write data to a memory address of the memory 114 which is outside of the valid address range then an error signal may be generated and the writing of the data to the invalid memory address may be prevented. In this way, the dedicated processor 104 can be prevented from corrupting areas of the memory 114 which it is not allowed to access.

Storing the result of an operation in the memory 114 allows the result of a first operation to be retrieved by the dedicated processor 104 during the execution of the next operation. This might not be possible with the overlapped operation in which results data passes back to the program processor via one register bank whilst data for the next operation is present in a different register bank, because in that case operation x has already been queued for operation before the results for operation x−1 haven been read. However, if the results of operation x−1 are stored in the memory 114 then the next operation (operation x) can use the results of operation x−1 as an input by retrieving the data from the memory 114.

In FIG. 1, the register banks 108 are shown to be situated outside of the dedicated processor 104. In other examples, the register banks 108 may be situated within the dedicated processor 104.

Similarly, in FIG. 1, the interfacing module 106 is shown to be situated outside of the program processor 102. In other examples, the functionality of the interfacing module 106 described herein could be implemented as part of the program processor 102, such that conceptually the interfacing module 106 is implemented within the program processor 102. As another alternative, the interfacing module 106 could be implemented within the dedicated processor 104.

Figure 4:
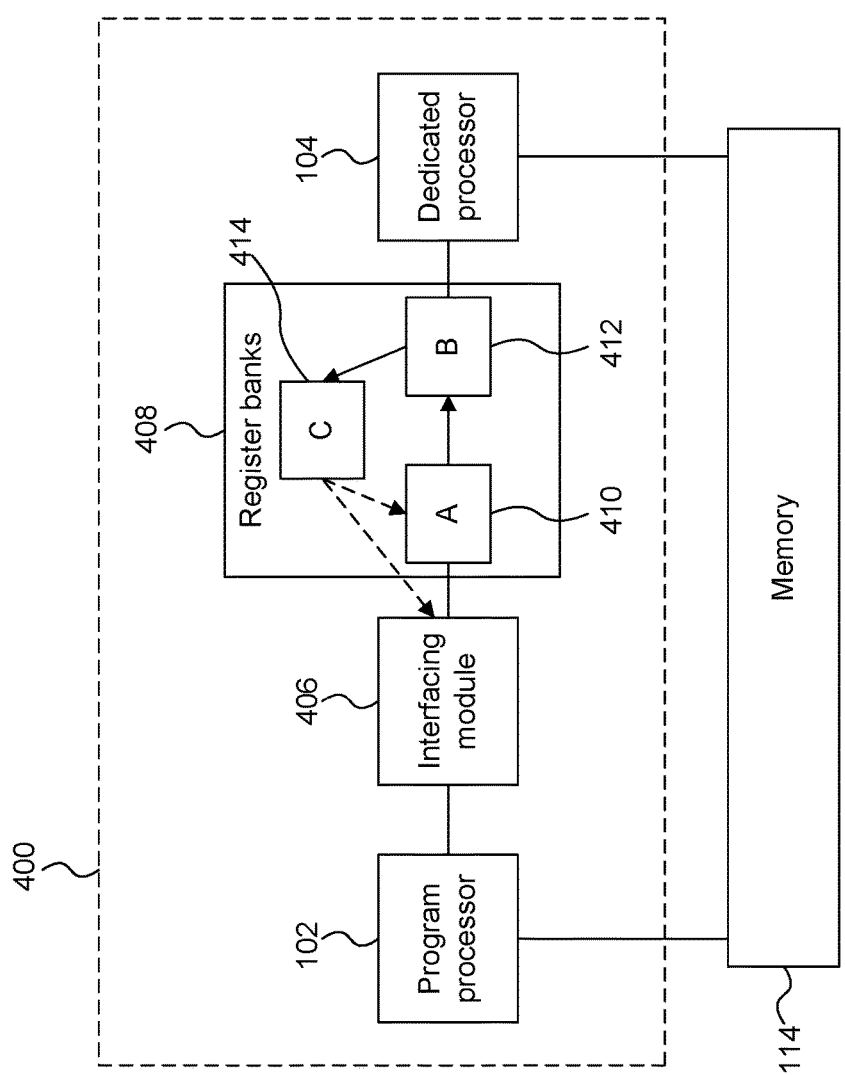
FIG. 4 is a schematic diagram of a processing system in a second example.

In the processing system 100 shown in FIG. 1 there are two register banks 110 and 112. FIG. 4 shows a processing system 400 in another example. The processing system 400 includes a program processor 102 and a dedicated processor 104 as described above in relation to FIG. 1. Furthermore the processing system 400 is coupled to a memory 114 in the same way as described above in relation to FIG. 1. The processing system 400 also includes an interfacing module 406 and a group of register banks 408, but these are slightly different to the corresponding elements of the processing system 100 shown in FIG. 1. In particular, the processing system 400 includes three register banks: a first register bank 410 (labelled "A" in FIG. 4) which is coupled to the interfacing module 406, a second register bank 412 (labelled "B" in FIG. 4) which is coupled to the dedicated processor 104, and a third register bank 414 (labelled "C" in FIG. 4) which is coupled to register bank B 412. The register bank C 414 is also coupled to one or both of the register bank A 410 and the interfacing module 406, wherein these couplings are shown with dotted lines to signify that in some examples only one of the couplings is present. Each of the register banks (410, 412 and 414) includes registers that the dedicated processor 104 can use in order to execute operations. That is, the register banks 410, 412 and 414 are configured to store data relating to operations of the particular type for which the dedicated processor 104 is adapted to execute.

The processing system 400 is operated in a similar manner to the processing system 100 described above, and similarly allows concurrent execution of a current operation on the dedicated processor 104 using data stored in one of the register banks, whilst data for a subsequent operation is loaded into a different one of the register banks. However, rather than toggling access between two register banks (110 and 112), in the processing system 400 three register banks are used. In this case, in response to determining that the dedicated processor 104 has completed execution of a current operation and that the data for a subsequent operation has been loaded into the register bank 410 (e.g. based on the execution complete flag and the loading complete flag), the interfacing module 406 can control the group of register banks 408 such that (a) results data for the current operation is passed from register bank B 412 to register bank C 414, and (b) the data for the subsequent operation is passed from register bank A 410 to register bank B 412, thereby allowing the dedicated processor 104 to execute the subsequent operation by accessing the data from register bank B 412. In this way, the dedicated processor 104 can quickly begin executing the subsequent operation after the current operation has completed execution.

If register bank C 414 is coupled to register bank A 410, then the interfacing module 406 may control the register banks 408 such that, once steps (a) and (b) described above have been performed, a step (c) is performed in which the results data for the current operation is passed from register bank C 414 to register bank A 410. This allows the interfacing module 406 to read the results data for the current operation from register bank A 410. When the results data has been read from register bank A 410 then the interfacing module 406 may load data for another operation into register bank A 410 whilst the dedicated processor is executing the subsequent operation, and the method can then repeat for a sequence of operations which are to be executed by the dedicated processor 104.

If register bank C 414 is coupled to the interfacing module 106, then the interfacing module 406 may control the register banks 408 such that, once steps (a) and (b) described above have been performed, a step (c) is performed in which the results data for the current operation is read from register bank C 414 by the interfacing module 106. When the results data has been read from register bank C 414 then the interfacing module 406 may load data for another operation into register bank A 410 whilst the dedicated processor is executing the subsequent operation, and the method can then repeat for a sequence of operations which are to be executed by the dedicated processor 104.

Figure 5:
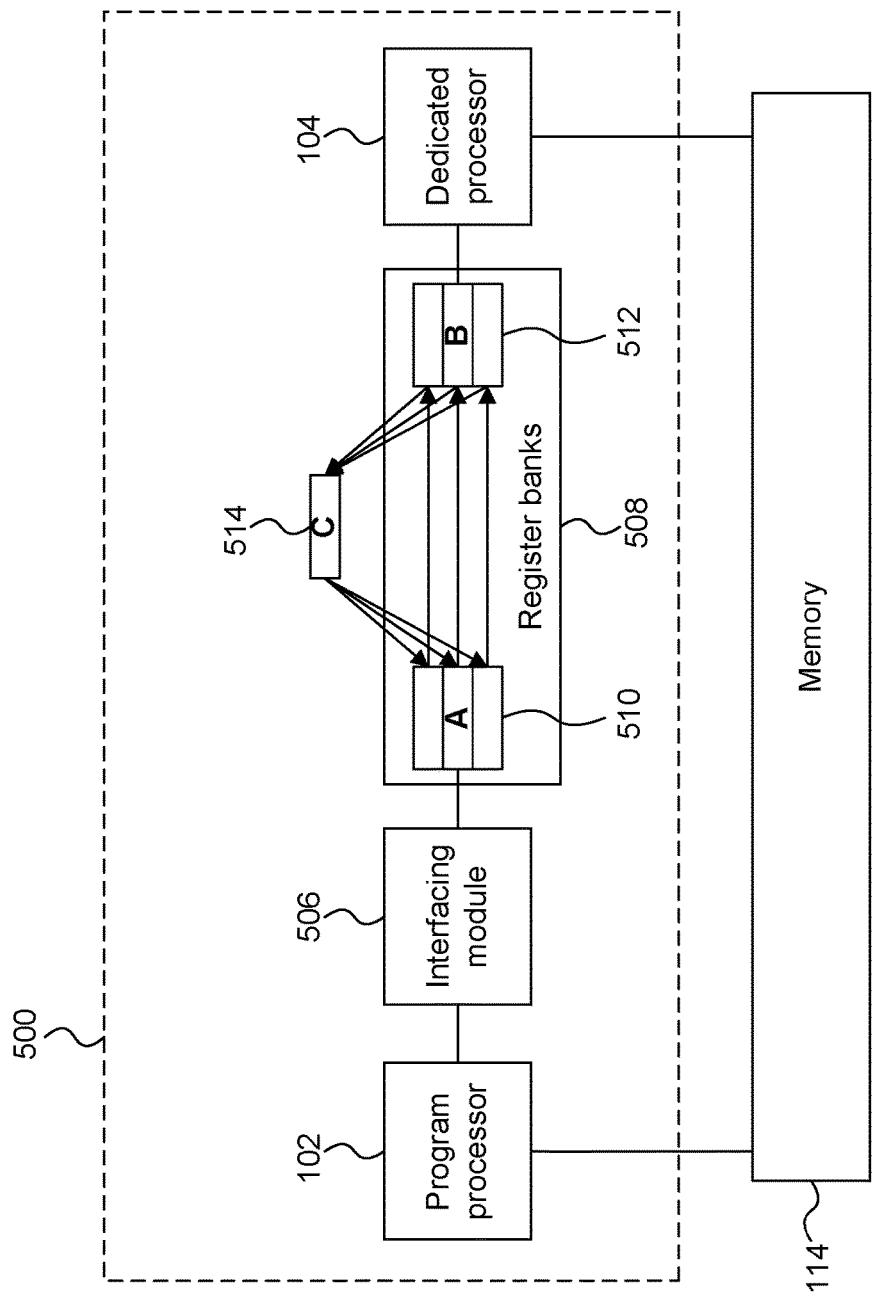
FIG. 5 is a schematic diagram of a processing system in a third example.

FIG. 5 shows a processing system 500 in a further example. The processing system 500 includes a program processor 102 and a dedicated processor 104 as described above in relation to FIG. 1. Furthermore the processing system 500 is coupled to a memory 114 in the same way as described above in relation to FIG. 1. The processing system 500 also includes an interfacing module 506 and a group of register banks 508, but these are slightly different to the corresponding elements of the processing system 100 shown in FIG. 1 and the corresponding elements of the processing system 400 shown in FIG. 4. In particular, the processing system 500 includes two register banks: a first register bank 510 (labelled "A" in FIG. 5) which is coupled to the interfacing module 506, and a second register bank 512 (labelled "B" in FIG. 5) which is coupled to the dedicated processor 104. The processing system 500 also comprises a cache 514 (labelled "C" in FIG. 5) which is coupled to both of the register banks 510 and 512. The cache 514 is configured to hold less data than each of the register banks 510 and 512. Each of the register banks (510 and 512) includes registers that the dedicated processor 104 can use in order to execute operations. That is, the register banks 510 and 512 are configured to store data relating to operations of the particular type for which the dedicated processor 104 is adapted to execute. The cache is configured to store a part of the data for an operation at a time, and is used to transfer data between the register banks 510 and 512, part by part.

The processing system 500 is operated in a similar manner to the processing systems 100 and 400 described above, and similarly allows concurrent execution of a current operation on the dedicated processor 104 using data stored in one of the register banks, whilst data for a subsequent operation is loaded into a different one of the register banks. However, in response to determining that the dedicated processor 104 has completed execution of a current operation and that the data for a subsequent operation has been loaded into the register bank 510 (e.g. based on the execution complete flag and the loading complete flag), the interfacing module 506 can control the group of register banks 508 such that (a) part of the results data (e.g. data from a first ⅓ of the registers of the register bank 512) for the current operation is passed from register bank B 512 to the cache 514, (b) a corresponding part of the data (e.g. data from a first ⅓ of the registers of the register bank 510) for the subsequent operation is passed from register bank A 510 to register bank B 512, and (c) the part of the results data for the current operation in the cache 514 is passed from the cache 514 to register bank A 510. Steps (a), (b) and (c) are iterated for different parts of data (e.g. for the second ⅓ of the registers of the register banks and then for the third ⅓ of the registers of the register bank) until all of the results data for the current operation has passed to register bank A 510 via the cache 514 and all of the data for the subsequent operation has passed to register bank B 512. This allows the dedicated processor 104 to execute the subsequent operation by accessing the data from register bank B 512, and it allows the interfacing module 506 to read the results data for the current operation from register bank A 510 and to pass the results data to the program processor 102. The interfacing module 506 may then load data for another operation into register bank A 510 whilst the dedicated processor is executing the subsequent operation. The amount of data in the "parts" of the data which are passed to or from the cache 514 may correspond with (e.g. be equal to) the amount of data that the cache can store at a given time. The method can repeat for a sequence of operations which are to be executed by the dedicated processor 104.

The three processing systems 100, 400 and 500 described above all allow the dedicated processor 104 to execute a current operation by accessing data from a register bank whilst data for a subsequent operation is loaded into a different register bank. However, the different systems have some differences. The processing system 100 is more area efficient than processing systems 400 and 500 because the processing system 100 includes just two register banks (110 and 112) whereas processing system 400 includes three register banks (410, 412 and 414) and processing system 500 includes two register banks and a cache (510, 512 and 514).

Each register bank or cache uses an amount of memory (e.g. each register bank may be arranged to store approximately 4000 bits) which thereby takes up area in the processing system. Furthermore, the processing system 100 allows for a single cycle switch over (i.e. toggling) of the register banks, so there is very little delay between the dedicated processor 104 finishing execution of an operation and commencing execution of the next operation. However, the toggling of the register banks could affect the timing of the dedicated processor 104, as the dedicated processor 104 is coupled to different register banks at different times.

In contrast, the processing system 400 uses three full register banks so it is less area efficient than systems 100 and 500. In the processing system 400, the switching of the data between the register banks between operations will take one or two cycles, so it is still quite fast (faster than system 500) but it might not be as fast as the toggling in the processing system 100. However, in the processing system 400, since the dedicated processor 104 is always coupled to the register bank 412 there is no adverse effect on the timing of the dedicated processor 104 due to switching the coupling of register banks as in the processing system 100.

The processing system 500 is somewhere in between the systems 100 and 400 in terms of area. The cache 514 uses less area than a full register bank (but more area than if no cache was implemented at all, as in the processing system 100). There is no impact on the timing of the dedicated processor 104 in system 500 because the dedicated processor 104 is always coupled to register bank B 512. However, the switch over of data between the register banks 512 and 514 takes multiple cycles because only part of the data from the register banks is transferred at a time (because the cache is too small to hold all of the data from a register bank at once). Therefore, the time between the dedicated processor 104 finishing executing an operation and commencing execution of the next operation is longer in the processing system 500 than in the processing systems 100 and 400. The size of the cache 514 can be different in different examples to alter the trade-off of area versus switch over time.

In the examples described above, the processing systems use a queue depth of two for queuing operations to be executed by the dedicated processor 104, i.e. whilst the dedicated processor 104 is executing a current operation, data (e.g. control data) for just one subsequent operation is loaded into a register bank. In other examples, a processing system may use a queue depth of more than two, such that data for more than one subsequent operation can be held in respective register banks whilst the dedicated processor is executing a current operation. These processing systems would use more register banks than in the examples described above because a register bank is not used to store data for more than one operation at a time. The controlling of the register banks would need to be slightly different to that described above, but a person skilled in the art would be able to control the register banks suitably so that data for an appropriate operation is provided to the dedicated processor 104 at an appropriate time for execution thereon whilst results data for a previously executed operation can be read from another register bank and/or data for a subsequent operation can be loaded into another register bank as appropriate. For example, in a system in which the coupling of the register banks to either the interfacing module or the dedicated processor 104 is switched (similar to processing system 100), the register banks may be switched in an order (e.g. a round robin order) so that access is provided to the register banks in turn for the interfacing module and the dedicated processor 104, e.g. in a cyclical manner. Having a queue depth of greater than two may further decrease the time that the dedicated processor 104 spends not executing operations. For example, with reference to FIG. 3, when the dedicated processor finishes executing operation 2 (at time $t_5$) the data for operation 3 could already have been loaded into a register bank because the loading operation could start earlier at time $t_2$ (and the interfacing module may at that time be loading data for operation 4 into a further register bank), such that the dedicated processor 104 could immediately start to execute operation 3 (at time $t_5$) without waiting for operation 4 to finish loading into the further register bank. It is noted that, in this example, the times at which the access to one of the register banks is switched may be different for the interfacing module and the dedicated processor.

Figure 6:
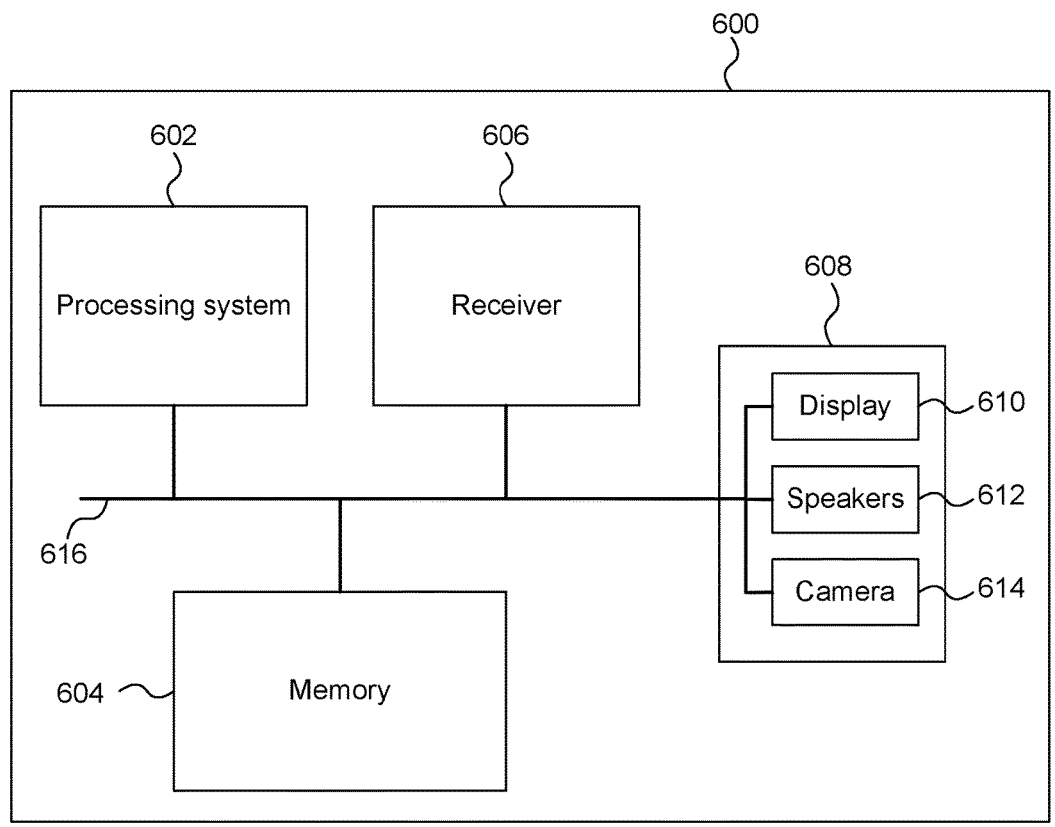
FIG. 6 is a schematic diagram of a computer system including a processing system.

The processing system (100, 400 or 500) described above can be implemented in a wider computer system. For example, FIG. 6 shows a computer system 600 which comprises a processing system 602 (which may be the processing system 100, 400 or 500 described above), a memory 604 (which may be the memory 114 described above) and a receiver 606. The receiver 606 is configured to receive signals from another device, and may include an antenna for receiving wireless signals. The computer system also comprises other devices 608, such as a display 610, speakers 612 and a camera 614. The components of the computer system can communicate with each other via a communications bus 616. In an example, the computer system 600 may be implemented in a device such as a mobile phone, tablet, laptop, television or any other suitable device. The receiver 606 may be configured to receive signals and to pass them to the processing system 602, wherein the processing system 602 may include a DSP (as the dedicated processor 104) which can be used to efficiently execute digital signal processing operations on the signals received by the receiver 606.

In other embodiments, the systems may be controlled differently to the way in which the systems described herein are controlled, e.g. via the use flags, but may achieve similar effects.

Generally, any of the functions, methods, techniques or components described above (e.g. the processing systems 100, 400 and 500 and their components) can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof.

In the case of a software implementation, the module, functionality, component, unit or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component, unit or logic (e.g. the components of the processing systems 100, 400 and 500) may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component, unit or logic (e.g. the components of the processing systems 100, 400 and 500) may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component, unit or logic (e.g. the components of the processing systems 100, 400 and 500) described above, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a processing system configured to perform any of the methods described herein, or to manufacture a processing system comprising any apparatus described herein. The IC definition dataset may be in the form of computer code, e.g. written in a suitable HDL such as register-transfer level (RTL) code. An example of processing an integrated circuit definition dataset at an integrated circuit manufacturing system so as to configure the system to manufacture a processing system will now be described with respect to FIG. 7.

Figure 7:
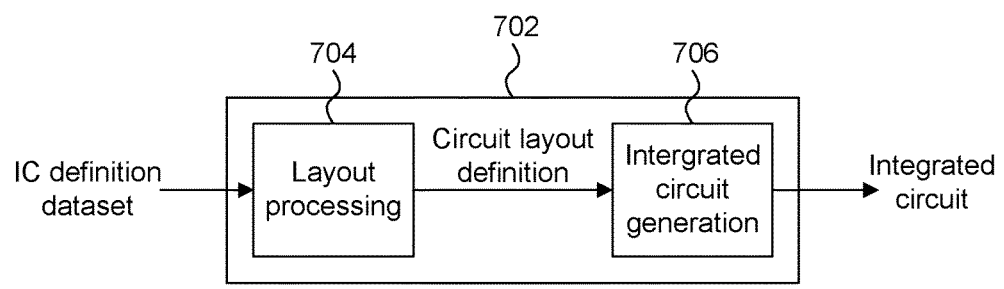
FIG. 7 shows an integrated circuit manufacturing system for generating an integrated circuit embodying a processing system.

FIG. 7 shows an example of an integrated circuit (IC) manufacturing system 702 which comprises a layout processing system 704 and an integrated circuit generation system 706. The IC manufacturing system 702 is configured to receive an IC definition dataset (e.g. defining a processing system as described in any of the examples herein), process the IC definition dataset, and generate an IC according to the IC definition dataset (e.g. which embodies a processing system as described in any of the examples herein). The processing of the IC definition dataset configures the IC manufacturing system 702 to manufacture an integrated circuit embodying a processing system as described in any of the examples herein. More specifically, the layout processing system 704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 704 has determined the circuit layout it may output a circuit layout definition to the IC generation system 706. The IC generation system 706 generates an IC according to the circuit layout definition, as is known in the art. For example, the IC generation system 706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 706 may be in the form of computer-readable code which the IC generation system 706 can use to form a suitable mask for use in generating an IC. The different processes performed by the IC manufacturing system 702 may be implemented all in one location, e.g. by one party. Alternatively, the IC manufacturing system 702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some examples, an integrated circuit definition dataset could include software which runs on hardware defined by the dataset or in combination with hardware defined by the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A processing system comprising:
a dedicated processor adapted for executing operations of a particular type;
a program processor configured to execute a program including a plurality of operations, wherein the program processor is configured to cause an operation of the program which is of the particular type to be executed by the dedicated processor;
a group of at least two register banks configured to store data relating to operations of the particular type;
an interfacing module configured to control data flow between the program processor and the dedicated processor using the group of register banks by:
concurrently: (i) providing the dedicated processor with access to one of the register banks which stores previously loaded data for a current operation, thereby allowing the dedicated processor to execute the current operation, wherein the interfacing module is configured to set an execution complete flag when the dedicated processor has completed the execution of the current operation, and (ii) accessing a different one of the register banks to load data for a subsequent operation into said different one of the register banks for subsequent execution by the dedicated processor, wherein the interfacing module is configured to set a loading complete flag when the data for the subsequent operation has been loaded; and
responsive to both the execution complete flag and the loading complete flag being set, controlling the group of register banks to provide the dedicated processor with access to the data for the subsequent operation from one of the register banks of the group of register banks, thereby allowing the dedicated processor to execute the subsequent operation.

2. The processing system of claim 1 wherein the interfacing module is further configured to use the access to said different one of the register banks to read results data for a previous operation executed by the dedicated processor from said different one of the register banks before the data for the subsequent operation is loaded into said different one of the register banks.

3. The processing system of claim 1 wherein the dedicated processor is configured to write results of operations executed by the dedicated processor to a memory which is different to said group of register banks.

4. The processing system of claim 3 wherein the interfacing module is configured to indicate which memory addresses in the memory are valid addresses for the results to be written to.

5. The processing system of claim 1 wherein a first register bank and a second register bank of the at least two register banks are each configured to be coupled to either the dedicated processor or the interfacing module at any given time, wherein the interfacing module is configured to control the coupling of the register banks such that when the dedicated processor is coupled to the first register bank the interfacing module is coupled to the second register bank, and vice versa.

6. The processing system of claim 5 wherein the interfacing module is configured to toggle the coupling of the register banks to the dedicated processor and the interfacing module responsive to determining that the dedicated processor has completed execution of the current operation and that the data for the subsequent operation has been loaded into said different one of the register banks.

7. The processing system of claim 1 wherein there are three register banks in said group of register banks, wherein:
a first of the register banks is coupled to the interfacing module;
a second of the register banks is coupled to the dedicated processor; and
a third of the register banks is coupled to the second register bank;
wherein the interfacing module is configured to control the register banks such that responsive to determining that the dedicated processor has completed execution of the current operation and that the data for the subsequent operation has been loaded into the first register bank: (a) results data for the current operation is passed from the second register bank to the third register bank, and (b) the data for the subsequent operation is passed from the first register bank to the second register bank, thereby allowing the dedicated processor to execute the subsequent operation by accessing the second register bank.

8. The processing system of claim 7 wherein the third register bank is further coupled to the first register bank, and wherein the interfacing module is configured to control the register banks such that further in response to determining that the dedicated processor has completed execution of the current operation and that the data for the subsequent operation has been loaded into the first register bank: (c) the results data for the current operation is passed from the third register bank to the first register bank, thereby allowing the interfacing module to read the results data for the current operation from the first register bank.

9. The processing system of claim 7 wherein the third register bank is further coupled to the interfacing module, and wherein the interfacing module is configured to control the register banks such that further in response to determining that the dedicated processor has completed execution of the current operation and that the data for the subsequent operation has been loaded into the first register bank: (iii) the results data for the current operation is read from the third register bank by the interfacing module.

10. The processing system of claim 1 wherein a first of the register banks is coupled to the interfacing module, and a second of the register banks is coupled to the dedicated processor;
wherein the processing system further comprises a cache which is coupled to both of the register banks and which is configured to hold less data than each of the register banks;
wherein the interfacing module is configured to control the register banks such that responsive to determining that the dedicated processor has completed execution of the current operation and that the data for the subsequent operation has been loaded into the first register bank: (a) part of the results data for the current operation is passed from the second register bank to the cache, (b) a corresponding part of the data for the subsequent operation is passed from the first register bank to the second register bank, and (c) the part of the results data for the current operation is passed from the cache to the first register bank;
wherein actions (a), (b) and (c) are iterated for different parts of data.

11. The processing system of claim 1 wherein the interfacing module is configured to use auto-generated code to load a description of an operation to be executed by the dedicated processor.

12. The processing system of claim 1 wherein operations of the particular type comprise data-parallel operations.

13. The processing system of claim 1 wherein the register banks are situated within the dedicated processor.

14. The processing system of claim 1 wherein the register banks are situated outside of the dedicated processor.

15. The processing system of claim 1, wherein the interfacing module is further configured, responsive to both the execution complete flag and the loading complete flag being set, to unset the execution complete flag and the loading complete flag.

16. The processing system of claim 1, wherein the dedicated processor is configured to execute operations written in a bespoke assembly language, and wherein the program processor is arranged to execute code written in a high level language.

17. A method of processing operations of a computer program comprising:
executing the program at a program processor, wherein the program processor causes an operation of the program which is of a particular type to be executed by a dedicated processor, wherein the dedicated processor is adapted for executing operations of the particular type;
controlling data flow between the program processor and the dedicated processor using a group of register banks by:
concurrently: (i) providing the dedicated processor with access to one of the register banks which stores previously loaded data for a current operation, thereby allowing the dedicated processor to execute the current operation, wherein an execution complete flag is set when the dedicated processor has completed execution of the current operation, and (ii) accessing a different one of the register banks to load data for a subsequent operation into said different one of the register banks for setting up the subsequent operation for subsequent execution by the dedicated processor, wherein a loading complete flag is set when the data for the subsequent operation has been loaded; and responsive to both the execution complete flag and the loading complete flag being set, controlling the group of register banks to provide the dedicated processor with access to the data for the subsequent operation from one of the register banks of the group of register banks, thereby allowing the dedicated processor to execute the subsequent operation.

18. A non-transitory computer readable storage medium having stored thereon a computer readable description of an integrated circuit that, when processed in an integrated circuit manufacturing system, causes the integrated circuit manufacturing system to manufacture a processing system comprising:

a dedicated processor adapted for executing operations of a particular type;

a program processor configured to execute a program including a plurality of operations, wherein the program processor is configured to cause an operation of the program which is of the particular type to be executed by the dedicated processor;

a group of two or more register banks configured to store data relating to operations of the particular type;

an interfacing module configured to control data flow between the program processor and the dedicated processor using the group of register banks by:

concurrently: (i) providing the dedicated processor with access to one of the register banks which stores previously loaded data for a current operation, thereby allowing the dedicated processor to execute the current operation, wherein an execution complete flag is set when the dedicated processor has completed execution of the current operation, and (ii) accessing a different one of the register banks to load data for a subsequent operation into said different one of the register banks for setting up the subsequent operation for subsequent execution by the dedicated processor, wherein a loading complete flag is set when the data for the subsequent operation has been loaded; and responsive to both the execution complete flag and the loading complete flag being set, controlling the group of register banks to provide the dedicated processor with access to the data for the subsequent operation from one of the register banks of the group of register banks, thereby allowing the dedicated processor to execute the subsequent operation.

\* \* \* \* \*